(12) United States Patent
Oberkofler et al.

(10) Patent No.: US 6,635,754 B1
(45) Date of Patent: *Oct. 21, 2003

(54) CELLULOSE PARTICLES, METHOD FOR PRODUCING THEM AND THEIR USE

(75) Inventors: Jörg Oberkofler, Seewalchen (AT); Thomas Moser, Linz (AT); Anton Schmalhofer, Vienna (AT); Jeffrey F. Spedding, Anif (AT)

(73) Assignee: TFM Handels-Aktiengesellschaft, Chur (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/475,432

(22) Filed: Dec. 30, 1999

Related U.S. Application Data (63) Continuation-in-part of application No. 08/894,314, filed as application No. PCT/EP96/00650 on Feb. 15, 1996, now Pat. No. 6,080,277.

(30) Foreign Application Priority Data

Feb. 21, 1995 (DE) .......................... 195 05 973
Jun. 7, 1995 (DE) .......................... 195 20 804

(51) Int. Cl.$^7$ .............................. C08B 3/00; D21H 3/48
(52) U.S. Cl. ............................ 536/30; 536/31; 536/56; 428/402; 162/157.6; 162/157.7; 162/164.1; 162/164.3; 162/182
(58) Field of Search .............................. 536/30, 31, 56; 428/402; 264/5; 162/157.6, 157.7, 164.1, 164.3, 182

(56) References Cited

U.S. PATENT DOCUMENTS 4,624,743 A * 11/1986 Gess ...................... 162/164.1
5,520,869 A * 5/1996 Taylor ........................ 264/203

FOREIGN PATENT DOCUMENTS

| EP | 377046 | 7/1990 |
|---|---|---|
| GB | 1421957 | 1/1976 |
| WO | WO92/19652 | 11/1992 |

OTHER PUBLICATIONS

Chem. Abstract 104:20914v ("Water–Soluble Cellulose Derivatives"; Daicel Chemical Industries, Ltd.; *43–Wood Products*, vol. 104, p. 77; ©1986).

Chem. Abstract 92:43522p ("Quaternary Ammonium Derivatives of Cellulose"; Fuji Chemical Co., Ltd.) *43–Wood Products*, vol. 92, p. 83; ©1980).

"Effects of Retention and Drainage Aids on Paper Machine Drainage: A Review" (*Tappi Journal*; L. H. Allen et al.; pp. 79–84; Jul., 1991).

"Cellulose: Structure, Modification, and Hydrolysis" (R. A. Young et al.; Wiley–Interscience Publication; pp. 102–110; ©1986).

* cited by examiner

*Primary Examiner*—James O. Wilson
*Assistant Examiner*—Howard V. Owens, Jr.
(74) *Attorney, Agent, or Firm*—Fay, Sharpe, Fagan, Minnich & McKee, LLP (57) ABSTRACT

Cellulose particles are described that have cationic groups in their interior. In one aspect, at least 10%, and preferably 50% or more, of the cationic groups are present within the particle interior. Also disclosed are particular combinations of such cellulose particles with certain water-soluble polymers that are well suited for use in the papermaking industry.

14 Claims, 1 Drawing Sheet

Figure

Dark field image

Enlargement factor: 100

CELLULOSE PARTICLES, METHOD FOR PRODUCING THEM AND THEIR USE

CROSS-REFERENCES TO RELATED APPLICATIONS

The present application is a continuation-in-part application from U.S. application Ser. No. 08/894,314 filed Oct. 14, 1997, now U.S. Pat. No. 6,080,277 which is a 371 of PCT/EP96/00650 filed Feb. 15, 1996.

FIELD OF THE INVENTION

The present invention relates to cellulose particles and to methods for producing such particles. The present invention further deals with applications of the cellulose particles.

BACKGROUND OF THE INVENTION

Due to various measures such as circuit concentration, increased use of de-inking pulps and high-yield pulps such as wood pulp and TMP (thermomechanic pulp), and neutral processing, there has been an increase in the load of interfering substances (trash) in water circuits of the paper industry.

Interfering substances were first defined as all substances that reduce the efficacy of cationic retention aids in the paper stock, i.e. those substances added in order to improve the retention of the fiber/filler mixture. Recently this definition has been more precisely stated as interfering substances are generally, dissolved or colloidally dissolved anionic oligomers or polymers and nonionic hydrocolloids.

These interfering substances have different effects. They impair the action of retention aids, dry- and wet-strength agents, i.e. substances increasing the strength of the paper, and furthermore lead to deposits in the paper machine circuit, forming drainage disturbances and a loss of paper strength, whiteness and opacity.

In order to eliminate the adverse effects of these interfering substances on papermaking one uses alum, polyaluminum chloride, low-and high-molecular fixers, cationic starch and inorganic adsorbents. All these substances become attached to the anionic trash with the aid of electrostatic interactions and form complexes therewith. Through binding of these complexes to the fibers or through filtration, these aggregates are removed from the paper machine system.

However, all these products have their own disadvantages. For example aluminum salts can only be used to a limited extent in neutral processing, which is gaining importance due to the increasing use of calcium carbonate as a filler, since they are not cationically charged and thus not very effective in this pH range.

The use of highly charged, cationic polyelectrolytes in turn involves the problem of exact metering. Otherwise an overcationization of the paper machine circuit and thus cationic dispersion can occur. This means that there can be poor fine-substance retention and reduced sizing.

SUMMARY OF THE INVENTION

The present invention addresses the foregoing noted objectives and provides, in a first aspect, a cellulose particle comprising cationic groups wherein at least 10% of the cationic groups are present in the interior of the particle.

In yet another aspect, the present invention provides cellulose particles having cationic groups that are distributed across the entire cross section of the particles. The concentration of the cationic groups is constant or preferably, increases from the exterior to the interior of the particles. The particles include at least one cationic group per 100 anhydroglucose units of cellulose.

In yet another aspect, the present invention provides an aqueous system comprising water, a water soluble polymer, and cellulose particles having cationic groups, wherein the cationic groups are present in the interior of the particles.

DESCRIPTION OF THE PREFERRED EMBODIMENTS

The problem addressed by the present invention is to provide a new type of cellulose particles characterized by special properties and that are useful for a wide array of applications. The problem addressed by the invention is further to provide cellulose particles which permit interfering substances in the paper circuit, machine circuit or water circuit to be bound in the paper in the greatest possible quantity and thus removed from the circuit without the above-described problems occurring. The problem addressed by the present invention is also to provide further possible applications of cellulose particles.

The present invention is based on the finding that these and other problems can be solved by utilizing cellulose particles which have cationic groups in the interior of the particles.

In accordance with the present invention, at least 10%, preferably at least 50%, and more preferably at least 90%, of the cationic groups are located in the interior of the particles. As a result, cellulose particles are thus provided which have cationic groups bound to cellulose distributed over the entire cross section of the particles.

So that the particles have sufficient cationicity, at least one cationic group should be present per 100, and preferably per 50, anhydroglucose units of the cellulose.

For producing the inventive cellulose particles one reacts the cellulose with a cationizing agent.

The cellulose used can be unsubstituted pulp but also substituted celluloses, in particular cellulose ester or ether such as methyl cellulose, carboxymethylcellulose, cellulose sulfate, cellulose acetate or chitosan. The degree of substitution (DS) should be smaller than 1, that is, no more than one of the three OH groups of the anhydroglucose units of the cellulose should be substituted on average. The DS must not be too great so that a sufficient number of hydroxyl groups are available for reaction with the cationizing agent. Further, alkali cellulose, in particular sodium cellulose, can be used as cellulose.

The reaction of the cellulose with the cationizing agent can be performed as a solids reaction. The cellulose used can be alkali cellulose which is reacted with the cationizing agent in a kneader.

For producing the inventive cellulose particles the cellulose can also be dissolved and the dissolved cellulose mixed with the cationizing agent, whereupon the cationized dissolved cellulose is precipitated into the cellulose particles.

Dissolving the cellulose can be done by converting the cellulose with sodium hydroxide solution and carbon disulfide into sodium xanthogenate, but also by dissolving it in N-methylmorpholine-N-oxide, lithium chloride dimethylacetamide, tetraammine copper copper(II) hydroxide, cupriethylenediamine or cuprammonium.

N-methylmorpholine-N-oxide monohydrate has a melting point of about 70° C. It can therefore be recovered easily as solids. In contrast to xanthogenate, no bad smell occurs and no waste materials such as sodium sulfate are obtained.

In the case of water-soluble cellulose derivatives one can use water as a solvent. Water-soluble cellulose derivatives are preferably prepared by the viscose process.

The cationic groups can be bound covalently to the hydroxyl groups of the cellulose. However a bond via ionic and/or hydrogen bridges is also possible.

The cationizing agents used can be aluminum salts such as polyaluminum chloride or sodium aluminate. The polyaluminum chloride can be partly hydrolyzed. The aluminate is precipitated together with the xanthogenate with sulfuric acid.

The cationizing agents used can further be cationic polyelectrolytes, such as polydialkyldiallylammonium salts, in particular polydialkyldiallylammonium chloride (poly-DADMAC), dicyandiamide, dicyandiamide condensate, polyamines, polyimines such as polyethylene imine, or ionenes. The cationizing agents used can further be reactive monomers, for example primary, secondary and tertiary amines, quaternary ammonium bases each with at least one residue reacting with a hydroxyl group of the cellulose.

If the cationizing agent does not react with the hydroxyl groups of the anhydroglucose units of the cellulose, as in the case of aluminum salts and cationic polyelectrolytes, the solubility of the cellulose does not change much or at all. In this case the ratio of cationizing agent to cellulose can fluctuate within wide limits. Normally, however, the weight ratio of aluminum salts or cationic polyelectrolytes to cellulose is between 0.03:1 to 1:1 based on the absolutely dry substances (abs. dry).

The reactive monomers, however, are preferably added to the cellulose in a quantity such that the degree of substitution (DS) is no more than 0.2. Otherwise cellulose particles with excessive water solubility can arise.

The cationizing agent with reactive groups, i.e. reactive monomers, used can be in particular 2-chloroethane trimethylammonium chloride or propoxytrimethylammonium chloride.

By precipitating dissolved cellulose with a high degree of substitution, for example carboxymethylcellulose, in an aqueous solution with cationic polyelectrolytes one can likewise obtain the inventive cationized cellulose particles.

Since the cationic charges in the inventive cellulose particles are fixed predominantly in the interior of the particles, one can beat (grind) the particles to make further charges accessible which can act as functional groups.

If reactive monomers are used as a cationizing agent the reactive groups are residues reacting with cellulose hydroxyl groups. The reacting residue can be for example a halogen atom, epoxy groups or imino groups. In order to form an epoxy group, a halogen atom can for example be bound to one carbon atom, and a hydroxyl group to the adjacent carbon atom, of an alkyl residue of the amine or quaternary ammonium base. For example the ammonium compound can be 3-chloro-2-(hydroxypropyl)-trimethylammonium chloride.

In order to prevent crosslinking of individual cellulose fibers in particular in the case of dicyandiamide and other polyelectrolytes, the cellulose can be reacted in relatively high dilution with the cationizing agent. That is, when mixed with the cationizing agent the dissolved cellulose is present in a concentration of preferably no more than 2 percent by weight, and more preferably no more than 1 percent by weight.

Reacting the dissolved cellulose with the cationizing agent is preferably done with stirring, in a time period of for example 10 seconds to 30 minutes depending on the reactivity of the cationizing agent. If the reaction time is too long there is the abovementioned danger of crosslinking.

Precipitating the dissolved cationized cellulose can be done for example through fine spinning jets in precipitation baths.

If the dissolved cellulose used is cellulose xanthogenate, the precipitant can be for example a polyaluminum chloride or sulfuric acid, whereby the sulfuric acid may optionally have salts, e.g. a sulfate such as sodium or zinc sulfate, added.

As has turned out, the cellulose particles can also be obtained by adding a precipitant to the dissolved cationized cellulose with stirring and thus causing precipitation directly in the reactor.

The size of the cellulose particles, or the length of the precipitated cellulose fibers, is then dependent on, among other things, the dilution of the dissolved cationized cellulose and the stirring rate during precipitation.

The particles of cationized cellulose preferably have a mean particle size of 0.001 to 10 mm, and more preferably a mean particle size of 0.1 to 1 mm. The particles are preferably spherical. However they can also exist in the form of fibers.

A desired size and structure of the cellulose particles can in particular also be obtained by beating.

For comminuting the cellulose particles one can use a great variety of beating apparatuses, in particular standard devices for pulp beating such as a Jokro mill, conical refiner or disk refiner. The beaters customarily used for beating paper fibers are also very suitable. Beating causes a substantial enlargement of the cellulose particle surface and thus increased cationicity and efficacy.

Figure 1:
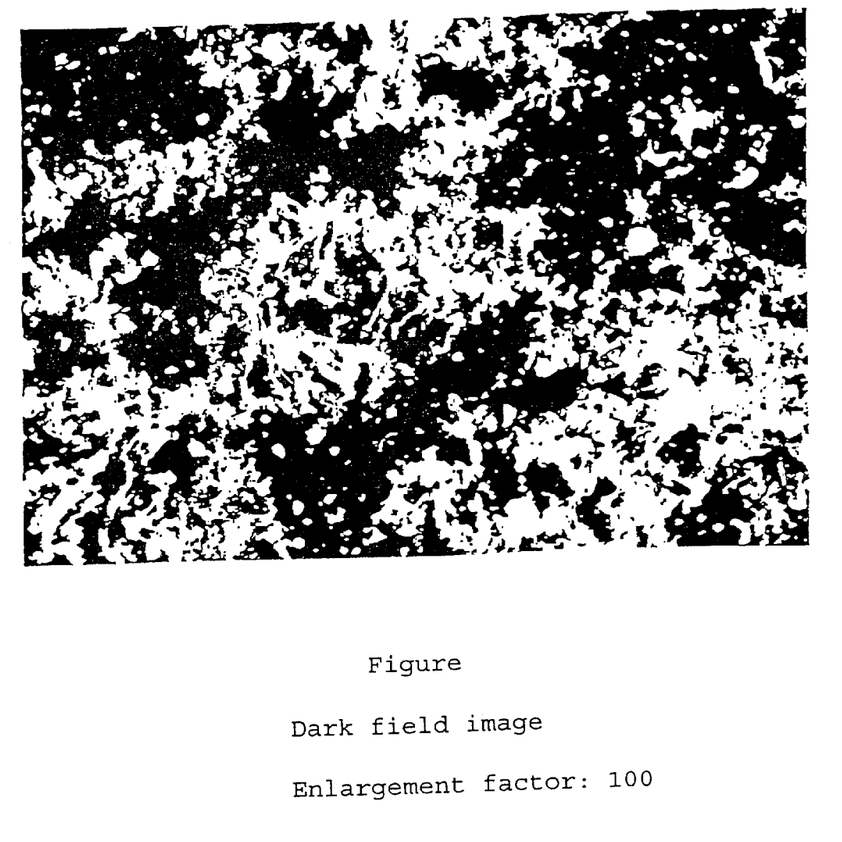
FIG. 1 is a magnified dark field image of cellulose particles according to the present invention.

The single figure shows cellulose particles in a dark field image. The particles are in a swollen state. The particles are actually spherical in three dimensions but they are squeezed between the slides in the picture. The enlargement factor is 100. The random fibril structure with fibrils in the range of 10 to 50 microns is easily recognized.

When the cellulose particles are used in papermaking the particle size must obviously not be thicker than the paper thickness, while a fiber structure can be advantageous.

When the cationized cellulose fibers are used as a means for fixing the interfering substances in the paper they should not be longer than 0.5 mm in order to rule out forming problems. The cationized cellulose fibers are preferably no longer than 0.1 mm.

For other applications, e.g. as a flocculent, in particular a flocculent for waste-water purification, a mean particle size of 0.1 to 1 mm is usually preferred.

The cellulose particles are used as a solid or in the form of a suspension.

The inventive cellulose particles can be termed water-insoluble. This means that the cellulose particles virtually do not dissolve in water in the usual dwell times and application methods. The dwell times are in the range of minutes.

In the inventive cellulose particles the cationic groups are bound covalently to the cellulose or immobilized within the cellulose membrane. This covalent bond or immobilization prevents any relevant loss of cationic activity during use of the cellulose particles.

The inventive cellulose particles are used as solids, whereby they can contain up to 80% water. It is also conceivable to dry these cellulose particles and use them as dry granules. Alternatively one can use them in the form of a suspension, for example with 3% solids content, or in the form of a paste with higher solids contents up to 20%.

After precipitation of the dissolved cationized cellulose polymer chains, the cationic groups are contained in the cellulose particles and uniformly distributed over the total cross section thereof.

The cationic groups present in the interior of the cellulose particles are insensitive to mechanical action, being e.g. not removed by the shear forces caused by stirring.

The inventive cationized cellulose particles are an outstanding means for fixing interfering substances in the paper which are present in the water circuits during papermaking.

Use of the cationic cellulose has no adverse effect on the paper properties, unlike known means for fixing interfering substances in the paper such as bentonite.

At the same time the inventive cationized cellulose causes the fine substances, in particular the fine filler particles, to bind with the fibers, thereby improving the fine-substance or ash retention and the distribution of fine substances in the paper and obtaining a more homogeneous sheet. That is, the inventive cationized cellulose permits the fine substances to be retained both on the side of the cellulose particle/filler mixture facing the wire and on the upper side.

Above all else, however, the inventive cationized cellulose causes anionic trash, which (as mentioned above) occurs in greater quantity in the paper machine circuit typically used at present, to bond with the cellulose particles of the cellulose particle/filler mixture and thus be discharged from the circuit.

In particular when the inventive cationized cellulose fiber is short, i.e. has a length of e.g. 0.1 mm or less, this in addition demonstrably increases the strength of filled paper, a crucial property for judging paper quality. This is possibly due to the fact that short cationized cellulose particles collect in the spaces between longer cellulose fibers of the paper and form bridges between the cellulose fibers of the paper.

In the paper industry the inventive cationized cellulose particles can thus be used as a strength-increasing means for filled paper or as a means for fixing interfering substances in the paper, thereby removing these interfering substances from the water circuit.

Furthermore the inventive cationized cellulose particles are a means for retaining fine substances in the paper during papermaking. That is, fine ash or other filler particles or other fine solids particles which are to be incorporated in the paper are retained by the inventive cationized cellulose particles, i.e. protected from being washed out and thus kept in the paper. This achieves increased homogeneity and dimensional stability of the paper. Since the fine substances are bound better, this at the same time reduces the tendency to dust during processing of the paper. In addition the inventive cationized cellulose particles lead to an increase in strength in filled paper.

The invention thus includes in particular a method for producing paper using a closed water circuit to which the inventive cellulose particles are added. The interfering substances are thereby bound and rendered harmless. One generally adds 0.1 kg of cationized cellulose particles per ton of paper stock (abs. dry). The upper limit is generally 10 kg/ton for reasons of cost.

At the same time the inventive cationized cellulose particles are an outstanding flocculation aid for poorly precipitable organic sludges. The inventive cationized cellulose particles can thus be used in particular as a flocculent for waste-water purification, above all in clarification plants for flocculating digested sludge. Compared to conventional flocculants, in particular polyelectrolytes, the inventive cationized cellulose particles have a greatly enlarged, stable cationic surface on which the substances to be flocculated can be precipitated. In contrast to conventional flocculants one thus obtains a more stable floc which can also be dewatered better.

It has turned out that use of the inventive cellulose particles in combination with water-soluble polymers produces surprising results, both when the cellulose particles are used in sludge drying and when they are used in papermaking.

Especially good results are achieved in combination with cationic, water-soluble polymers. However combinations with anionic or nonionic polymers are also conceivable.

An especially advantageous combination has turned out to be the combination of the inventive cellulose particles with water-soluble cationic polyacrylamide. Along with polyacrylamide one can in particular use polyethylene imine and water-soluble cellulose derivatives, for example cationic hydroxyethylcelluloses or carboxymethylcelluloses.

In sludge drying, the inventive, water-insoluble cellulose particles are preferably added in mixture with the water-soluble polymers. However separate addition is equally possible.

Based on the water-soluble polymer, for example polyacrylamide, the addition of inventive cellulose particles can be within very wide limits from 0.1 to 99.9 wt %. However preferred weight percentages of cellulose particles are 1 to 50%, preferably 1 to 10%, particularly 2 to 7% and in particular 3 to 5%. The percentage of cellulose particles is determined by the sludge quality, the desired dry content of the sludge and the throughput capacity.

When the inventive cellulose particles are used in combination with a cationic polymer, the two components are preferably premixed, stored and transported dry. Before application, the mixture is dissolved or dispersed in water and charged to the sludge directly without filtration, which is unnecessary for sludge.

This preferred use of the mixture of cellulose particles and polymers is only possible with cationic polymers, not with anionic polymers, since the latter would react with the cationic cellulose particles. Anionic polymers are therefore added separately from the cellulose particles.

When the inventive cellulose particles are used in combination with anionic polymer, the cellulose particles are stored, transported, prepared and metered separately, in a dry form or in the form of an aqueous suspension. The anionic polymer can likewise be stored and transported dry, dissolved in water, or as an emulsion. In any case the two components should be charged to the sludge separately as an aqueous solution or a suspension. One can use either possibility of charging, first cellulose particles or first polymer.

The synergistic effect obtained by the combination of water-soluble polymers and water-insoluble cellulose particles is impressive. The mechanism of action is unknown, however. For example, tests with biological sludge have shown that the use of 94.3 wt % polyacrylamide and 5.7 wt % cellulose particles, rather than the use of pure polyacrylamide, allows an increase in speed of the band press of 62 to 100% and an increase in sludge throughput of 28 $m^3/h$ to 33 $m^3/h$.

Other tests aimed at a higher dry content have also shown impressive results. Thus the addition of only 3 wt % cellulose particles to the polyacrylamide used resulted in an increase in dry content after pressing of 48 to 53%.

The combined use of cationic, water-soluble polymers and the inventive water-insoluble cellulose particles has also shown surprising results particularly in papermaking.

In papermaking a separate addition of cellulose particles and water-soluble polymers is preferred. It is advantageous to filter the water-soluble polymer as a solution continuously before the metering point in order to filter out gel particles impairing paper quality. It is better to add the cellulose particles before and the water-soluble polymers only later. In particular it is advantageous to add the cellulose particles in the initial phase of papermaking, while the water-soluble polymers are added in the final phase shortly before sheet formation.

Expressed as time history and assuming a total circulating time of about 90 seconds, the cellulose particles are added in 30 to 60 seconds before the feed of the paper stock to the headbox, and the water-soluble polymers about 10 to 20 seconds before.

The mixture ratio of cellulose particles and cationic polymers is variable within wide limits, for example from 90:10 to 10:90. However it is preferable to add 40 to 60% cellulose particles based on weight. The preferred quantity depends on the grade of paper, among other things. Higher percentages are preferred for paper with little filler.

In papermaking, the cellulose particles are preferably added in the form of a suspension in water, for example a 3% suspension. The polymer solution is added as an aqueous solution, for example in a concentration of 0.2 to 0.8%.

When anionic water-soluble polymers are used in combination with cellulose particles the same mixture ratios and manners of addition or adding times are preferred.

It has turned out that use of the inventive cellulose particles in papermaking can achieve greater quantities of filler in the paper. This is desirable for economic reasons since fillers are cheaper than paper fibers. Fillers achieve better properties, in particular improved opacity and printability.

A further advantage which has emerged from the addition of cellulose particles is improved forming of the paper and thus improved paper quality.

The term "cellulose particles" also refers in this patent to fibers of any form and length, in particular spun fibers. Cellulose fibers have diverse applications in the industrial and textile field.

The special feature of the inventive fibrous cellulose particles is their greatly improved dyeing behavior. In particular the fibers can be dyed with favorable anionic dyes. The dyed fibers are characterized by particular color fastness, which is due to the fact that the cationic groups reacting with the dyes are immobilized in the cellulose fiber or bound covalently to the cellulose molecules.

It can be shown that the immediately available cationic charge of the invented cationic cellulose particles can be progressively increased by successive refining, thus also showing that the cationic charge is distributed through the cross-section of the product. (See table in Example 21 herein.)

On the other hand, when surface-cationized cellulose fibres are refined, the immediately available cationicity is not significantly increased showing that the cationicity is substantially on or near the surface of the fibres.

Similarly, successive refining of such paper pulps as ground wood, thermo-mechanical pulp and also of such re-cycled materials as coated broke show that progressively more soluble or colloidal anionic substances are released into the aqueous phase of the pulp. These anionic substances or trash as they are known are usually detrimental to the papermaking process and are neutralized and fixed to reduce their negative effect.

When a water soluble, high cationic polyelectrolyte is used to treat anionic trash from such paper making pulps, neutralization of the anionic substances takes place immediately together with fixation of the complexes formed onto the fibres. At the same time, some of the cationic polyelectrolyte is directly absorbed onto the lightly anionic surface of the papermaking fibres. However, subsequent refining, as is to be found in certain papermaking systems, will release even more anionic trash whereby as the initially dosed cationic polyelectrolyte is no longer active, any additional anionic trash load will remain to burden the papermaking system. The stability of the trash fixation by this method is dependent on shear forces and some neutralized complexes will be stripped from the fibres to return as colloidal organic loading into the aqueous phase of the pulp increasing the chemical oxygen demand (COD) in the circuit water.

When surface-cationized cellulose particles are used instead of a water soluble cationic polyelectrolyte to treat these pulp types, the absorption of unwanted anionic substances onto the cationic cellulose takes place almost immediately. During any subsequent refining, a progressive increase of additional anionic trash is expected. An excess of surface cationized cellulose is needed to absorb any subsequent increase in anionic trash. As with anionic trash fixed to fibres using soluble cationic polymer, trash fixed onto surface cationized cellulose is also sensitive to shear forces and can be stripped from the cationized fibres increasing the organic load in the aqueous phase, namely in the paper machine circuits.

Surprisingly, when the invented cationic cellulose particles are used instead of a water soluble cationic polyelectrolyte or instead of a surface-cationized cellulose to treat these pulp types, during the papermaking process, namely during refining, any progressively released anionic trash will be simultaneously neutralized and absorbed by the progressively increased available cationic charge on and in the invented cationic cellulose particles. Additionally, because the anionic substances are partially absorbed into the substance of the invented cationic cellulose particle, the resultant neutralized complex is more stable to the shear forces present in a paper machine and the organic loading measured as chemical oxygen demand (COD) in the aqueous phase of the pulp remains advantageously low.

It is also known that an excess of water-soluble cationic polymer can have a negative effect on other additives that may be required in papermaking for instance in quenching of optical brightener.

For a similar added total cationicity, surface-cationized cellulose is seen to have a lesser but still significant negative effect on optical brightener. Surprisingly, the invented cationized cellulose particles, although exhibiting a similar total available cationicity (measured over an extended time period), do not have any significant quenching effect on optical brightener while still remaining able to absorb other anionic disturbing substances from the paper machine process water.

The following examples will explain the invention further.

EXAMPLE 1

An 8.5 weight percent, aqueous sodium cellulose xanthogenate solution is diluted with 0.02 N sodium hydroxide in a ratio of 1:25.

250 ml of the diluted sodium cellulose xanthogenate solution is mixed with stirring (350 rpm) with 1 ml of a 40 weight percent, aqueous solution of dicyandiamide.

After five minutes of stirring the speed is increased (600 rpm), whereupon 5 ml of an 18 weight percent, aqueous polyaluminum chloride solution is added dropwise.

The precipitated cellulose fibers are washed with water until the supernatant has no more cationic charges.

EXAMPLE 2

100 kg of pulp is converted with 18% aqueous sodium hydroxide into alkali cellulose (AC). 20 kg of 3-Cl-2-hydroxy-propanetrimethylammonium chloride is added to the pressed AC. The reaction is performed in the kneader with cooling at 35° C. for 6 hours. Then neutralizing is done with hydrochloric acid and washing with water. The obtained cationized cellulose is dried and beaten to the necessary particle size.

EXAMPLE 3

To detect the cationicity of the cellulose fibers obtained in Example 1 one uses methyl red as an anionic dye. The cationicity of conventional precipitated, unmodified cellulose fibers was compared with the cationized cellulose fibers produced according to Example 1. The fibers were mixed for this purpose with the methyl red solution and then centrifuged. After centrifugation, the color of the fibers and the coloration of the supernatant were judged.

In the cationized cellulose fibers produced according to Example 1 there was a clear coloration of the fibers and at the same time a decolorization of the supernatant, in contrast to unmodified cellulose fibers.

As a control, methylene blue was used as a cationic dye. With the weakly anionic unmodified cellulose fibers a coloration of the fibers was observed, while the cationized cellulose fibers produced according to Example 1 did not color. Also, in the cationized fibers there was no decolorization of the supernatant.

EXAMPLE 4

To check the efficacy of the cellulose fibers produced according to Example 1, paper stock from a woody and ashy production (raw material for natural rotogravure) was mixed with the cationic cellulose fibers produced according to Example 1, whereby sheets were formed by the standard method. Sheet weight, bursting pressure, tear propagation strength and forming in the paper were judged. It turned out that the cationized cellulose fibers produced according to Example 1 had a positive influence on the distribution of fine substances, including the ash distribution, and the strength and forming in comparison to a simultaneously performed comparative test (without addition of such cationized fibers).

EXAMPLE 5

With cationized cellulose fibers produced according to Example 1 with an average length of about 4 cm, a flocculation test was performed with digested sludge from a waste-water clarification plant which is difficult to flocculate since it is very fine. It turned out that the cationized cellulose fibers yielded good flocculation, a high settling rate and a clear supernatant, whereas a comparative test with a conventional flocculent, namely polyacrylamide, showed only little flocculation.

EXAMPLE 6

An 8.5 weight percent aqueous solution of sodium cellulose xanthogenate was diluted with an aqueous solution of sodium hydroxide (4 g/l) to 4.25% (as cellulose).

The cationizing agent, a 40% aqueous solution of a dicyandiamide formaldehyde condensate resin (a commercially available product from SKW Trostberg, MELFLOCK C3), was diluted with water to 2 weight percent active concentration.

600 ml of the above diluted 2% dicyandiamide formaldehyde condensate resin solution was stirred with a stirrer at 750 rpm and then 940 ml of the above sodium cellulose xanthogenate solution, diluted to 4.25%, was slowly added to the stirred cationizing agent.

This mixture already containing precipitated particles was then slowly added to the precipitation bath. The precipitation bath consisted of 3000 ml of aqueous solution containing 35 g of sulfuric acid (98%), which was likewise continually stirred. In this precipitation bath there was a quantitative precipitation of the product. More acid was added if necessary to ensure a pH of less than 2.

The precipitated, fibrous product was filtered out through a filter-funnel fitted with a fine plastic gauze sieve, taken up and shaken in 1000 ml of deionized water. The pH was adjusted to between 4.5 and 5.5 with diluted sodium hydroxide solution.

The precipitated product was once again filtered out through a filter-funnel fitted with a fine plastic gauze sieve, repeatedly taken up and shaken in 1000 ml of deionized water and filtered until no significant further cationicity could be detected in the supernatant.

During this washing stage, the residual cationicity, if any, was measured by titrating an aliquot against a standardized anionic polymer with a particle charge detector ($\mu$Tek PCD 02), or detected by a suitable dye (ortho-toluidine blue) as an indicator.

The wet product (solids content approximately 12 to 20%) was removed from the filter and then stored in this state.

EXAMPLE 7

An 8.5 weight percent aqueous solution of sodium cellulose xanthogenate was diluted with aqueous sodium hydroxide solution (4 g/l) to 1% (as cellulose).

The cationizing agent, a 40% aqueous solution of a polydiallyldimethylammonium chloride (a commercially available product, FLOERGER FL 45 C), was diluted with water to 1 weight percent active concentration.

2000 ml of the above sodium cellulose xanthogenate solution diluted to 1% was stirred with a high-shear stirrer without allowing air to be drawn into the solution. 600 ml of the above 1% polydiallyldimethylammonium chloride solution was subsequently added to the stirred solution over a 30 second period. The resultant mixture was stirred vigorously for one further minute.

The reaction of the cationizing agent with the cellulose xanthogenate solution causes an immediate and increasing rise in viscosity in the mixture. If, for example, the undiluted substances viscose and poly-DADMAC are mixed together (at the above solids contents) the mixture immediately solidifies, subsequently separating to a solid phase and a liquid phase.

1000 ml of an aqueous solution containing 25 g of sulfuric acid (98%) was added to the stirred mixture and the precipitation thus completed. More acid was added if necessary to ensure a pH of less than 2.

The precipitated, fibrous product was filtered out through a filter-funnel fitted with a fine plastic gauze sieve, taken up and shaken in 500 ml of deionized water. The pH was adjusted to 4.5 to 5.5 with diluted sodium hydroxide solution.

The precipitated product was again filtered out through a filter-funnel fitted with a fine plastic gauze sieve, repeatedly taken up and shaken in 500 ml of deionized water and filtered until no significant cationicity could be detected in the supernatant.

During this washing stage, the residual cationicity, if any, was measured by titrating an aliquot against a standardized anionic polymer with a particle charge detector ($\mu$Tek PCD 02), or detected by a suitable dye (ortho-toluidine blue) as an indicator.

The wet product (solids content approximately 12 to 20%) was removed from the filter and then stored in this state.

EXAMPLE 8

The same procedure as Example 6 was also conducted with a different cationizing agent, a 20 weight percent solution of polyethylene imine (a commercially available product from BASF, POLYMIN SK). The polyethylene imine solution was diluted with water to 2% concentration. 600 ml of this diluted cationizing agent solution was used in the reaction.

EXAMPLE 9

The same procedure as Example 6 was also conducted with a different cationizing agent, a 50 weight percent aqueous solution of a polyamine (a commercially available product, FLOERGER FL 17). The polyamine solution was diluted with water to 2% concentration: 600 ml of this diluted cationizing agent solution was used in the reaction.

EXAMPLE 10

An 8.5 weight percent aqueous solution of sodium cellulose xanthogenate was diluted with aqueous sodium hydroxide solution (4 g/l) to 4.25% (as cellulose).

The cationizing agent, a solution of reactive, cationic monomers (a commercially available product from Raisio, RAISACAT 65), comprised the following ingredients (approximately 70% concentration).

| | | |
|---|---|---|
| 1) | 3-Chloro-2-hydroxypropyl-trimethylammonium chloride ca. | 2% |
| 2) | 2,3-Epoxypropyl-trimethylammonium chloride ca. | 66% |
| 3) | 2,3-Dihydroxypropyl-trimethylammonium chloride ca. | 3% |

2.2 g of the commercial product was diluted to 200 ml with deionized water.

470 ml of the above sodium cellulose xanthogenate solution diluted to 4.25% was stirred at 800 rpm with a propeller stirrer without allowing air to be drawn into the solution. 200 ml of the above diluted cationizing agent solution was subsequently added over a 30 second period into the stirred solution. The resultant mixture was stirred for a further 30 minutes.

670 ml of an aqueous solution containing 18 g of sulfuric acid (98%) was added to the stirred mixture and the precipitation thus completed. More acid was added if necessary to ensure a pH of less than 2.

The precipitated, fibrous product was filtered out through a filter-funnel fitted with a fine plastic gauze sieve, taken up and shaken in 500 ml of deionized water. The pH was adjusted to 4.5 to 5.5 with diluted sodium hydroxide solution.

The precipitated product was once again filtered out through a filter-funnel fitted with a fine plastic gauze sieve, repeatedly taken up and shaken in 500 ml of deionized water and filtered until no significant further cationicity could be detected.

During this washing stage, the residual cationicity, if any, was measured by titrating an aliquot against a standardized anionic polymer solution with a particle charge detector ($\mu$Tek PCD 02), or detected by a suitable dye (orthotoluidine blue) as an indicator.

The wet product (solids content approximately 12 to 20%) was removed from the filter and then stored in this state.

EXAMPLE 11

The same procedure as Example 7 was also conducted with a different cationizing agent, a 40 weight percent aqueous solution of a special, highly branched, polydiallyldimethylammonium chloride. The polydiallyldimethylammonium chloride was diluted with water as in Example 7.

EXAMPLE 12

The same procedure as Example 7 was also conducted with a different cationizing agent, a 48.5 weight percent aqueous solution of a special, low-molecular polydiallyldimethylammonium chloride. The polydiallyldimethylammonium chloride was diluted with water to 1% concentration as in Example 7.

EXAMPLE 13

The same procedure as Example 6 was also conducted with a different cationizing agent, a 40 weight percent solution of a copolymer of diallyldimethylammonium chloride and acrylic acid, the monomer component acrylic acid constituting less than 10%. The copolymer solution was diluted with water to 1% concentration in this example.

EXAMPLE 14

An 8.5 weight percent aqueous solution of sodium cellulose xanthogenate was diluted with aqueous sodium hydroxide solution (4 g/l) to 2% (as cellulose).

The cationizing agent, a 29% aqueous solution of a polyaluminum chloride (a commercially available product from Ekokemi, EKOFLOCK 70), was used in undiluted form.

1000 ml of the above sodium cellulose xanthogenate solution diluted to 2% (as cellulose) was stirred with a propeller stirrer vigorously but without allowing air to be drawn into the solution. 21 ml of the above undiluted cationizing agent solution was subsequently added to the stirred solution over a 30 second period. The resultant mixture was stirred vigorously for one further minute.

1000 ml of an aqueous solution containing 20 g of sulfuric acid (98%) was added to the stirred mixture and the precipitation thus completed. More acid was added if necessary to ensure a pH of less than 2.

The precipitated, fibrous product was filtered out through a filter-funnel fitted with a fine plastic gauze sieve, taken up and shaken in 500 ml of deionized water. The pH was adjusted to 3 to 4 with diluted sodium hydroxide solution.

The precipitated product was once again filtered out through a filter-funnel fitted with a fine plastic gauze sieve, repeatedly taken up and shaken in 500 ml of deionized water and filtered.

The wet product (solids content approximately 12 to 20%) was removed from the filter and then stored in this state.

EXAMPLE 15

An 8.5 weight percent aqueous solution of sodium cellulose xanthogenate was diluted with aqueous sodium hydroxide solution (4 g/l) to 2% (as cellulose).

The cationizing agent, a 45% aqueous solution of a sodium aluminate (a commercially available product from Mare, FIMAR A 2527), was used in undiluted form.

1000 ml of the above sodium cellulose xanthogenate solution diluted to 2% was stirred with a propeller stirrer vigorously but without allowing air to be drawn into the solution. 24 ml of the above undiluted cationizing agent solution was subsequently added to the stirred solution over a 30 second period. The resultant mixture was stirred vigorously for one further minute.

1000 ml of an aqueous solution containing 37 g of sulfuric acid (98%) was then added to the stirred mixture and the precipitation thus completed. More acid was added if necessary to ensure a pH of less than 2.

The precipitated, fibrous product was filtered out through a filter-funnel fitted with a fine plastic gauze sieve, taken up and shaken in 500 ml of deionized water. The pH was adjusted to 3 to 4 with diluted sodium hydroxide solution.

The precipitated product was once again filtered out through a filter-funnel fitted with a fine plastic gauze sieve, repeatedly taken up and shaken in 500 ml of deionized water and filtered. The wet product (solids content approximately 12 to 20%) was removed from the filter and then stored in this state.

EXAMPLE 16

The same procedure as Example 7 was also conducted with a modified cellulose (sodium methyl cellulose xanthogenate). Low-substituted, water-insoluble methyl cellulose was used instead of the unmodified cellulose.

EXAMPLE 17

A solution of cellulose in lithium chloride, dimethyl acetamide (DMA) and water is prepared as follows.

Cellulose pulp which has been bleached and stored moist is added to a mixture of lithium chloride and dimethyl acetamide so that the components are present in the following ratio: 5 parts cellulose (dry weight), 11 parts lithium chloride, 82 parts dimethyl acetamide and some water (from the moist pulp).

This mixture is homogenized with a high-shear stirrer, and heated under vacuum over a water bath until the water content of the mixture is less than 3%. A dry nitrogen trickle-sparge is used to aid water removal.

The resultant suspension is cooled in a refrigerator to 5° C. and held for a day at this temperature. Periodic stirring aids dissolution of the suspended cellulose. The resultant solution is warmed to 50° C. and filtered through a fine sieve.

A 40 weight percent, aqueous solution of a polydiallyldimethylammonium chloride (a commercially available product, FLOERGER FL 45 C) is used as the cationizing agent.

Based on dissolved cellulose, 10% cationizing agent (as an active substance) in undiluted form is added slowly with continuous mixing. The small amount of water introduced into the solution with the cationizing agent normally does not interfere with the solution equilibrium of cellulose-lithium chloride-dimethylacetamine-water so that the cellulose does not precipitate but the viscosity of the resultant mixture begins rapidly to rise and the next stage follows immediately.

The resultant mixture, at a temperature of 50° C., is poured into the vortex region of a stirred aqueous precipitation bath whereby the cationized cellulose precipitates out.

The precipitated, fibrous product is filtered out of the mixture through a filter-funnel fitted with a fine plastic gauze sieve.

The filtered out product is shaken in deionized water and refiltered This washing process removes residual amounts of salts and DMA from the product.

The product is once again washed with deionized water and filtered. This process is repeated until no significant further cationicity in the filtrate water can be detected.

The wet product (solids content approximately 12 to 20%) is removed from the filter and then stored in this state.

EXAMPLE 18

A solution of cellulose in N-methylmorpholine-oxide (NMMO) was prepared as follows.

An NMMO/water mixture is analyzed for water content. This is normally around 30% water at this stage.

Pure cellulose in powder form was added to the above mixture at a level to give 3.6 weight percent (based on NMMO). This mixture was then placed in a vacuum flask fitted with a stirrer and a sparge pipe which is used to trickle-feed dry nitrogen gas under the liquid surface. The flask was then heated to 95° C. in a water bath. A vacuum was applied, the stirrer was turned on and a small quantity of nitrogen was allowed to bubble through the liquid phase, thus progressively removing water.

At a certain concentration of water and NMMO (approx. 88% NMMO) the cellulose dissolves. The nitrogen purge and vacuum pump were then stopped. In this experiment a 40% solution of a polydiallyldimethylammonium chloride (a commercially available product, FLOERGER FL 45 C) was used as a cationizing agent.

Based on dissolved cellulose, 10% cationizing agent (as an active substance) was added in undiluted form to the cellulose solution with stirring. The small amount of water (approximately 0.5%) introduced into the NMMO solution by the cationizing agent normally does not alter the solution equilibrium of cellulose-NMMO/water as to cause precipitation of the cellulose.

The resultant mixture was pumped using a gear-wheel pump through a glass wool packed filter and then through a spinning jet into a water bath, where the cationized cellulose coagulated and could be formed into fibers.

These fibers were filtered off, washed and dried and then cut to approximately 1 cm length.

EXAMPLE 19

A 2 weight percent aqueous solution of carboxymethylcellulose (CMC) having a degree of substitution of approximately 0.55 was prepared and stirred for one hour to ensure complete dissolution of the CMC.

The cationizing agent, a 40% aqueous solution of a dicyandiamide formaldehyde condensate resin (commercially available from SKW Trostberg, MEL-FLOCK C3), was diluted with water to 4 weight percent concentration.

1000 ml of the above 2% CMC solution was stirred at 800 rpm with a propeller stirrer and 125 ml of the above aqueous solution of dicyandiamide formaldehyde condensate resin diluted to 4% was subsequently added in a 10 second period. This mixture already containing precipitated cationized cellulose was stirred for a further 5 minutes.

The precipitated product was filtered out through a filter-funnel fitted with a fine plastic gauze sieve, repeatedly taken up and shaken in 500 ml of deionized water and filtered until no significant further cationicity could be detected in the supernatant.

During this washing stage, the residual cationicity, if any, was measured by titrating an aliquot against a standardized anionic polymer solution with a particle charge detector ($\mu$Tek PCD 02), or detected by a suitable dye (ortho-toluidine blue) as an indicator.

The wet product (solids content approximately 12 to 20%) was removed from the filter and then stored in this state.

EXAMPLE 20

The solids content of the cationized cellulose from Example 6 was measured. Enough of the wet product to give 10 g of dry product was taken and made up to 200 g with water. This dispersion was transferred to a Jokro mill and beaten for 10 minutes at 1500 rpm. This type of mill is normally used in a paper laboratory to test the beating characteristics of fibers for papermaking. The above beating parameters are comparable to those used for testing fibers for papermaking.

The procedure was also repeated using beating times of 5, 15, 30 and 45 minutes. After measuring the solids content, the beaten particles were diluted to 3 weight percent suspension. The wet product (solids content approximately 3%) was stored in this state.

EXAMPLE 21

The cationicity of the various products from Example 20 was measured by titrating against standardized 0.001 N sodium polyethylene sulfonic acid (Na-PES) using ortho-toluidine blue as an end-point indicator.

Alternatively, the cationicity was measured by back titration as follows. Product obtained by the above methods was mixed with an excess amount of standardized 0.001 N sodium polyethylene sulfonic acid (Na-PES) and stirred for one hour. The solids were then centrifuged out and an aliquot of the clear supernatant titrated against 0.001 N polydiallyldimethylammonium chloride (poly-DADMAC) in a particle charge detector. The charge of the product was calculated from the consumption of poly-DADMAC.

The cationicity measured by back titration is normally higher than directly measured cationicity. This can be explained by the fact that during back titration the reagent can penetrate the cellulose structure due to the longer duration and thus react with the less accessible charge carriers.

The following table shows the cationicity of the product from Example 6 as a function of different beating times. One can see that the cationicity increases with an increase in beating time, which can be explained by the fact that longer beating reduces the particle size and thus the specific surface area and the available charge.

| Beating time in Jokro mill (minutes) | Cationic charge (dry product) (micro-equivalents/gram) |
| --- | --- |
| 0 | 251 |
| 5 | 394 |
| 10 | 748 |
| 15 | 911 |
| 30 | 978 |
| 45 | 1027 |

EXAMPLE 22

The nitrogen content of the dry product from Example 6 was measured using the kjeldahl method.

The nitrogen content of the dried cationizing agent from Example 6 was likewise measured.

The reference value used for nitrogen content was non-cationized cellulose precipitated out in acid as sodium cellulose xanthogenate. However the values were below the detection limit of this method.

By comparing the amount of cationizing agent used and the nitrogen content in the finished product one can derive the yield of the reaction. Depending on the choice of cationizing agent, it is typically between 60 and 90%.

EXAMPLE 23

The solids content of cationized cellulose made with similar raw materials as in Example 6 was measured. Enough of the wet product (solids content 15%) to give 380 g as dry product was added to the pulper of a Sulzer Escher Wyss P 12 laboratory conical refiner. This refiner is normally used in the paper laboratory for testing the beating characteristics of fibers for papermaking.

The above amount of cationized cellulose was filled up with water to 12.5 liters and dispersed for 1 minute. The slurry was then transferred to the refiner section of the apparatus, the entrained air was removed and the product pumped under continuous circulation through the refiner for 5 minutes and thus beaten.

The power setting was kept at 350 watts by an automatic control during beating, the speed of the rotor was 1500 rpm. The beating energy for processing the cationized cellulose was approximately 0.08 kW/kg.

The above beating parameters are comparable to those which are used for beating fibers for papermaking.

The beating of the product was also conducted with different times (1, 2, 3, 4, 6, 7, 8, 9 and 10 minutes).

After beating, the solids content was measured again, the beaten product was diluted to 3% concentration, and stored in this state.

EXAMPLE 24

The product from Example 6 was dried in a hot air oven at 105° C. until the moisture content was between 4 and 8%. In this form the product could easily be broken up into small lumps, the consistency being comparable to hard bread, and stored for some time in this state.

EXAMPLE 25

The dried product from Example 24 was wetted with water for about 10 minutes and then beaten in a Jokro mill for 10 minutes as described in Example 20. After beating, the solids content was measured again and the beaten product diluted to 3% concentration and stored in this state.

EXAMPLE 26

The dried product from Example 24 was ground in the dry state in a Braun model 4045 coffee mill at the finest setting for 5 minutes and then stored in this state.

EXAMPLE 27

The cationized cellulose from Example 6 was beaten for 10 minutes using the procedure from Example 20. The resultant fine solids particles were filtered out of the beaten slurry onto a microfine synthetic filter cloth and subsequently dried at 90° C. In this state the product could easily be broken up into small lumps, comparable to hard bread, and was stored in this state.

EXAMPLE 28

The product from Example 20 was spun in a laboratory centrifuge for 5 minutes at 1000 rpm. The supernatant aqueous phase was decanted off. The pasty compound remaining in the tubes had a solids content of approximately 18% and was stored in this state.

EXAMPLE 29

The product produced in Example 28 was diluted with water to about 3% and slowly stirred. The very fine, pasty product could thus be dispersed in water again very easily and within a short time.

EXAMPLE 30

The product produced in Example 28 was added to a solution of a water-soluble cationic polyacrylamide (FLOERGER FO 4190) as is used for sludge dewatering. In this case, 5% of the cationized cellulose based on the dry weight of cationic polyacrylamide was added.

The mixture was stirred slowly. The product could thus be dispersed in the polyacrylamide solution very easily and within a short time

EXAMPLE 31

The dried product from Example 27 was added to water to give a concentration of 3% and stirred for 10 minutes. Then dispersion was performed in a high-shear mixer for 5 minutes, resulting in a homogeneous suspension.

EXAMPLE 32

The product made in Example 20 using a 10 minute beating time was stirred slowly to maintain the uniformly dispersed state of the product. The stirring was turned off and after one hour the cationized cellulose particles were seen to be partially sedimented out.

After several days a sediment paste formed that constituted about one half of the liquid volume. The stirrer was once again switched on whereby this sediment could readily redisperse uniformly in the water The thus diluted product, now at approximately 3% solids content, was pumped in a circuit using a diaphragm pump (maximum capacity 23 liters/hour) fitted with ball valves at the suction and delivery sides and with suitable pipework of 16 mm internal diameter. After 24 hours of continuous circulation there was no reduction of the pumping efficiency.

Another portion of the dispersed product (also now at 3% solids content) was pumped in a circuit using a small, screw-feed or "Mohno" pump (maximum capacity 20 liters/hour) fitted with a rubber stator for aqueous media. After 24 hours of continuous circulation there was no reduction of the pumping efficiency.

EXAMPLE 33

Dewatering of Biological Sludge

Cationized cellulose from Example 20 was used as a 3% dispersion in combination with a cationic, water-soluble polyacrylamide-based flocculant used in the prior art for dewatering sludge (commercially available as Allied Colloids, DP7-5636). This accelerated the dewatering of biological sludge and increased the solids content of the dewatered sludge compared to use of the cationic polyacrylamide flocculant alone.

The sludge used in this field test is from a combined municipal/industrial sewage works and contains a mixture of primary and biological sludge. This sludge was taken from a point between the sludge thickener after the anaerobic digester and the final dewatering press, before any precipitants/flocculants were added. The solids content was approximately 2%.

The standard powdery polymer used in this plant was prepared as an aqueous 0.3 weight percent solution. This cationic, water-soluble polymer was chosen as the most suitable product after a series of optimization trials.

The cationized cellulose was diluted with water further to a 0 3% solids content. This means that any mixture of the two products will always have the same concentration of active ingredients.

The following setup was used for the laboratory tests:

1) A Britt-jar drainage test apparatus (see enclosed diagram) was fitted with a preweighed black ribbon filter (Schleicher & Schüll 589, 110 mm diameter, ashless). The sieve normally used in the paper laboratory for dewatering tests and the precision stirrer were not used.

2) The drainage tube, equipped with an off/on valve, was connected using flexible silicone tubing to a vessel placed on a balance. The balance was programmed to send a signal of the registered weight at set time intervals to a computer, where it was recorded. This permitted dewatering curves of filtrate weight against time to be recorded. The collecting vessel was also fitted with a flexible tube to a vacuum pump so that a preset vacuum level was adjustable during dewatering.

3) The precision stirrer supplied with the Britt-jar was installed so that the content of a 500 ml beaker could be stirred.

4) Filter papers (Schleicher & Schüll 589, black ribbon, 110 mm diameter), dosing syringes, balance, drying oven, etc.

The following measuring procedure was used.

A series of flocculant solutions were prepared by mixing 0.3% cationized cellulose dispersion with the 0.3% cationic, water-soluble polyacrylamide (PM) flocculant to give a range from straight PM through various mixtures to straight cationized cellulose. The concentration of active ingredients was the same in all mixtures.

500 ml of fresh untreated sludge with 2% solids content was placed in a beaker and stirred at 200 rpm for 1 minute. 15 ml of the flocculant was then added (45 mg) using a syringe. This simulates the dosage used in practice.

The thus treated sludge was mixed slowly for a further 2 minutes. During this time, the vacuum pump was turned on so that the vacuum could stabilize. The filter paper in the Britt-jar was moistened and the balance zeroed.

130 ml of flocculated sludge from the beaker was added to the Britt-jar, thereby forming a layer of sludge approx. 1.5 cm deep. The valve between the Britt-jar and the collecting vessel was opened and the data transmission from the balance to the computer started.

The filtrate weight in the collecting vessel was thus recorded automatically during dewatering. When the sludge was fully dewatered, as seen by a cessation of liquid coming into the collecting vessel and by air being drawn through the sludge into the collecting vessel or, in the case of poor dewatering, by the filter being blocked by fine substances, the test was stopped. The sludge remaining on the filter was tested for solids content. The filtrate was tested for turbidity and for chemical oxygen demand (COD).

The procedure was repeated for various flocculants. The results of filtrate weight were plotted against time for each of the flocculants used. The dry substance content as well as the filtrate turbidity and COD were also tabulated against each flocculant used.

Results:

TABLE 1

(Dewatering speed of sludge)
Dewatering of biological sludge, with various levels of cationized cellulose used in combination with polyacrylamide - Filtrate weights at various times

| | Flocculant system for sludge dewatering tests as percent of particular component | | | | | | | | | |
|---|---|---|---|---|---|---|---|---|---|---|
| | % cationized cellulose | | | | | | | | | |
| | 0 | 0 | 1 | 2 | 4 | 6 | 8 | 10 | 50 | 100 |
| | % cationic polyacrylamide | | | | | | | | | |
| Drainage time (minutes) | 0 | 100 | 99 | 98 | 96 | 94 | 92 | 90 | 50 | 0 |
| | Weight of filtrate over time (g) | | | | | | | | | |
| 1 | 5 | 31 | 37 | 48 | 50 | 31 | 32 | 27 | 25 | 8 |
| 2 | 5 | 48 | 50 | 55 | 57 | 46 | 45 | 39 | 30 | 10 |
| 3 | 7 | 54 | 56 | 62 | 67 | 50 | 47 | 44 | 31 | 10 |
| 4 | 8 | 58 | 61 | 69 | 75 | 52 | 51 | 46 | 35 | 15 |
| 5 | 10 | 64 | 67 | 73 | 76 | 55 | 53 | 46 | 37 | 17 |
| 6 | 10 | 67 | 69 | 75 | 80 | 58 | 57 | 53 | 42 | 20 |

TABLE 2

(Solids content of dewatered sludge)
Dewatering of biological sludge with various levels of
cationized cellulose in combination
with polyacrylamide -
Solids content of dewatered sludge
Flocculant system for sludge dewatering tests
as percent of particular component % cationized cellulose

| 0 | 0 | 1 | 2 | 4 | 6 | 8 | 10 | 50 | 100 |
|---|---|---|---|---|---|---|----|----|-----|

% cationic polyacrylamide

| 0 | 100 | 99 | 98 | 96 | 94 | 92 | 90 | 50 | 0 |
|---|-----|----|----|----|----|----|----|----|----|

Solids content of dewatered sludge (%)

| * | 19.6 | 20.8 | 22.7 | 24.2 | 21.9 | 21.5 | 21.0 | 16.1 | * |
|---|------|------|------|------|------|------|------|------|---|

Note
Samples marked * could not dewater in a reasonable time since the filter was blocked by fine substances.

TABLE 3

(Turbidity and COD of filtrate)
Dewatering of biological sludge, with various levels
of cationized cellulose used in combination
with polyacrylamide - Filtrate turbidity and COD Flocculant system for sludge dewatering tests
as percent of particular component
% cationized cellulose

| 0 | 0 | 1 | 2 | 4 | 6 | 8 | 10 | 50 | 100 |
|---|---|---|---|---|---|---|----|----|-----|

% cationic polyacrylamide

| 0 | 100 | 99 | 98 | 96 | 94 | 92 | 90 | 50 | 0 |
|---|-----|----|----|----|----|----|----|----|---|

Chemical oxygen demand of filtrate (mg $O_2$/l)

| COD mg $O_2$/l | 1580 | 1080 | 1060 | 980 | 970 | 1000 | 1040 | 1050 | 1400 | 1590 |
|---|---|---|---|---|---|---|---|---|---|---|

Turbidity of filtrate (FNU)

| Turbidity FNU | +450 | 405 | 400 | 388 | 364 | 393 | 402 | 415 | +450 | +450 |
|---|---|---|---|---|---|---|---|---|---|---|

The replacement of approximately 4% of the water-soluble cationic polyacrylamide by cationized, water-insoluble, beaten cellulose particles yielded a surprising and significant increase in the dewatering speed for this sludge, together with a marked increase in the solids content of the dewatered sludge and a reduction in the turbidity and chemical oxygen demand in the filtrate.

EXAMPLE 34

Dewatering of Primary Sludge

The same test procedure as in Example 33 was used for this sludge except for the following differences.

The cationized cellulose used was that made in Example 7 with poly-DADMAC as the cationizing agent, the cellulose being beaten for 10 minutes by the procedure described in Example 20.

The sludge used in this example was taken from an industrial, mechanical waste-water plant where waste water is normally precipitated, sedimented, the sediment concentrated in a sludge thickener and then, after treatment with a water-soluble cationic polyacrylamide, dewatered on a band press.

The standard product used in this plant is known by the trade name FLOEGER FO 4190. The sludge used for the laboratory tests was again taken from a point between the sludge thickener and the band press, before any flocculant was added. The solids content of this sludge was 2%.

Results:

TABLE 4

(Filtrate weight during dewatering time)
Dewatering of biological sludge with various levels of
cationized cellulose used in combination
with polyacrylamide - Filtrate weights at various times Flocculant system for sludge dewatering tests
as percent of particular component % cationized cellulose

| | 0 | 0 | 1 | 2 | 4 | 6 | 8 | 10 | 50 | 100 |
|---|---|---|---|---|---|---|---|----|----|-----|

% cationic polyacrylamide

| Drainage time (minutes) | 0 | 100 | 99 | 98 | 96 | 94 | 92 | 90 | 50 | 0 |
|---|---|---|---|---|---|---|---|---|---|---|
| | Weight of filtrate from dewatering of sludge (g) | | | | | | | | | |
| 0.5 | 8 | 21 | 22 | 23 | 25 | 26 | 25 | 21 | 18 | 12 |
| 1.0 | 12 | 37 | 40 | 42 | 43 | 44 | 41 | 31 | 24 | 17 |
| 1.5 | 14 | 49 | 52 | 55 | 57 | 58 | 52 | 42 | 30 | 19 |
| 2.0 | 15 | 54 | 56 | 60 | 64 | 67 | 60 | 49 | 35 | 21 |
| 2.5 | 18 | 57 | 58 | 63 | 67 | 72 | 63 | 54 | 40 | 23 |
| 3.0 | 20 | 59 | 60 | 66 | 72 | 76 | 69 | 59 | 46 | 24 |

TABLE 5

(Solids content of dewatered sludge)
Dewatering of biological sludge with various levels of cationized cellulose in combination with polyacrylamide -
Solids content of dewatered sludge
Flocculant system for sludge dewatering tests as percent of the particular component

| % cationized cellulose | | | | | | | | | |
|---|---|---|---|---|---|---|---|---|---|
| 0 | 0 | 1 | 2 | 4 | 6 | 8 | 10 | 50 | 100 |
| % cationic polyacrylamide | | | | | | | | | |
| 0 | 100 | 99 | 98 | 96 | 94 | 92 | 90 | 50 | 0 |
| Solids content of dewatered sludge (%) | | | | | | | | | |
| * | 32.1 | 33.8 | 34.4 | 37.6 | 42.3 | 38.5 | 35.2 | 27.6 | 23.1 |

Note
The samples marked * could not dewater in a reasonable time since the filter was blocked by fine substances.

TABLE 6

(Turbidity and COD of filtrate)
Dewatering of biological sludge, with various levels of cationized cellulose used in combination with polyacrylamide - Filtrate turbidity and COD Flocculant system for sludge dewatering tests as percent of particular component

| % cationized cellulose | | | | | | | | | |
|---|---|---|---|---|---|---|---|---|---|
| 0 | 0 | 1 | 2 | 4 | 6 | 8 | 10 | 50 | 100 |
| % cationic polyacrylamide | | | | | | | | | |
| 0 | 100 | 99 | 98 | 96 | 94 | 92 | 90 | 50 | 0 |

Chemical oxygen demand of filtrate (mg $O_2$/l)

| COD mg $O_2$/l | 1250 | 890 | 880 | 810 | 740 | 790 | 870 | 880 | 1120 | 1150 |
|---|---|---|---|---|---|---|---|---|---|---|

Turbidity of fitrate (FNU)

| Turbidity FNU | +450 | 320 | 308 | 285 | 252 | 267 | 312 | 338 | 401 | 449 |
|---|---|---|---|---|---|---|---|---|---|---|

The replacement of approximately 6% of the water-soluble cationic polyacrylamide by cationized, water-insoluble, beaten cellulose particles yielded a surprising and significant increase in the dewatering speed for this sludge, together with a marked increase in the solids content of the dewatered sludge and a reduction in the turbidity and chemical oxygen demand in the filtrate.

EXAMPLE 35

Coagulating Agent in Waste-water Treatment

The wash water from a paper coating machine often contains anionically charged latex which is a constant problem as a interfering substance when this wash water is reused in paper manufacture, as is desirable. It is normally required that this wash water be coagulated by neutralization so that it can be reused as dilution water on a paper machine or passed into the waste-water purification plant.

The coagulating agents normally used for this purpose are either based on water-soluble, highly cationic polymers or solutions of multipositive metal ions, or combinations of the two.

This example demonstrates how the addition of cationized cellulose eliminates anionic, colloidal material from the water. Subsequently the sedimentation of these ingredients by treatment with conventional chemicals is also improved.

Waste water from a paper coating machine was taken fresh. By titration with a μTek PCD-02 titrator system, the charge, which was highly anionic, was measured. The turbidity and the chemical oxygen demand were also very high.

As a control, a sample treated with a standard precipitant (polyaluminum chloride (PAC)) was used which was subsequently flocculated with two types of a water-soluble, polyacrylamide (anionic+cationic).

Approximately 10% cationized cellulose, based on the amount of the dry weight of polyacrylamide, was added to the waste-water sample and mixed for a fixed time. Then the normally used amount of PAC was added, followed by the amount of polyacrylamide reduced by the weight of added cationized cellulose (equal to about 90% of the standard amount).

The thus treated waste water was poured into a calibrated measuring cylinder and allowed to stand for one hour.

The sludge volume was then measured. A smaller volume indicates a higher, and thus more advantageous, sludge density. The turbidity and chemical oxygen demand were also measured. As this water would normally be reused as process water or alternatively passed into the waste-water purification plant, low turbidity and COD are an advantage.

TABLE 7

(Volume of sediment turbidity and COD)
Application of cationized cellulose in coagulation and sedimentation of paper coating machine waste water.
Analysis of sedimentation in a 100 ml measuring cylinder.

| Coagulation/flocculation system used | Volume of sediment after 1 hr. ml | Turbidity of supernatant liquid FNU | COD of supernatant liquid mg $O_2$/l |
|---|---|---|---|
| none | 30 (poor separation of sediment) | +450 | 1640 |
| PAC + PAA (cationic) | 12 | 44 | 260 |
| PAC + PAA (anionic) | 14 | 36 | 290 |
| cat. cellulose + PAC + PAA (cationic) | 10 | 35 | 230 |
| cat. cellulose + PAC + PAA (anionic) | 10 | 33 | 220 |

Surprisingly, the pretreatment of the waste water with cationized cellulose clearly improved the sedimentation, turbidity and COD over those levels obtained with the standard system. These positive properties were detected in combination with both cationic and anionic PAA.

EXAMPLE 36

Paper Manufacturing

Cationized cellulose from Example 6 was beaten for 10 minutes as in Example 20 and diluted to 3% suspension. This product was used in a laboratory test rig for paper retention systems either as a substitute or as an additional component, thereby yielding various improvements for the papermaking process.

Retention/Fixation

A Britt-jar drainage tester was used.

Part 1—Application in Woodfree, Fine Paper Stock

In the first part of this example, a synthetic paper stock was prepared from a mixture of woodfree, beaten, short and long fibers together with ground calcium carbonate filler. This thick stock was diluted, salts were added to adjust the conductivity, and the pH was adjusted to neutral. The stock, when filtered, had a negative charge due to the dissolved or colloidally dissolved substances (anionic trash).

This anionic charge is measured as cationic demand and results from titrating an aliquot of the filtrate against a standardized cationic polymer (0.001 N polyethylene imine) in a particle charge detector, or using suitable color indicators such as ortho-toluidine blue as an end-point indicator.

A series of drainage tests was carried out using various retention systems and also replacing individual components of these systems by the cationized cellulose explained above. These drainage tests were conducted with the Britt-jar stirrer in operation.

In tests using cationized cellulose as part of the retention system, this component was added before the second component, a water-soluble polymer. The second component was only added shortly before the start of the dewatering phase.

The Britt-jar filtrate (A) was tested for solids content by being filtered through a preweighed, ashless filter paper giving a second filtrate (B). The filter paper was ashed to determine the content of filler retention. The second filtrate (B) was tested for chemical oxygen demand (COD), for turbidity, and for residual anionic charge or cationic demand, as described above.

The results of this test series are shown in Table 8.

TABLE 8

Effect of cationized cellulose combined with water-soluble polymer on total retention, filler retention, etc. Britt-jar test - woodfree, fine paper stock, carbonate filler, neutral conditions

| | Britt-jar filtrate | | post-filtered Britt-jar filtrate | | |
|---|---|---|---|---|---|
| | total solids g/l | filler content g/l | turbidity FNU | CSB mg $O_2$/l | cationic demand mg PSK/l |
| Retention aid system | | | FNU | mg $O_2$/l | mg PEI/l |
| no retention aid (blank) | 2.03 | 1.14 | 445 | 1060 | 49 |
| 0.6% cationic polyacrylamide | 1.71 | 1.17 | 294 | 810 | 9.6 |

TABLE 8-continued

Effect of cationized cellulose combined with water-soluble polymer on total retention, filler retention, etc. Britt-jar test - woodfree, fine paper stock, carbonate filler, neutral conditions

| | Britt-jar filtrate | | post-filtered Britt-jar filtrate | | |
|---|---|---|---|---|---|
| | total solids g/l | filler content g/l | turbidity FNU | CSB mg $O_2$/l | cationic demand mg PSK/l |
| 0.3% cationic polyacrylamide + 1.0% bentonite | 1.59 | 1.22 | 432 | 790 | 18 |
| 0.3% cationized cellulose + 0.3% cationic polyacrylamide | 1.34 | 0.95 | 297 | 770 | 8.7 |

Part 2—Application in a Groundwood/De-ink Containing Stock

In the second part of the test series, paper stock was taken as thick stock directly from a paper machine mixing chest. This stock contained groundwood pulp, deinking pulp, a small amount of pulp fibers together with china clay as a filler and was diluted to 1% consistency.

The same test procedure as above was conducted on this stock. This time a water-soluble polyethylene imine was used as a standard retention aid for the Britt-jar drainage tests. This polyethylene imine, which is also the standard retention aid on the paper machine concerned, was partly replaced by cationized cellulose.

The results of this test series are shown in Table 9.

TABLE 9

Effect of cationized cellulose combined with water-soluble polymer on total retention, filler retention, etc. Britt-jar test - groundwood/deinking/woodfree mixed stock, clay filler, pseudo-neutral conditions.

| | Britt-jar filtrate | | post-filtered Britt-jar filtrate | | |
|---|---|---|---|---|---|
| | total solids g/l | filler content g/l | turbidity FNU | CSB mg $O_2$/l | cationic demand mg PSK/l |
| retention aid system | | | FNU | mg $O_2$/l | mg PEI/l |
| no retention aid (blank) | 8.8 | 6.2 | 237 | 345 | 41 |
| 0.6% polyethylene imine | 7.1 | 5.3 | 128 | 242 | 25 |
| 0.3% cationized cellulose + 0.3% polyethylene imine | 6.6 | 5.0 | 94 | 226 | 21 |

The replacement of some of the water-soluble cationic polymer (either polyacrylamide as in Example 1 or polyethylene imine as in Example 2) by cationized, water-insoluble, beaten cellulose particles yields a surprising and significant increase in the retention of fine substances including filler, and reduced turbidity, reduced chemical oxygen demand and anionicity and thus a marked decrease in the dissolved and colloidally dissolved anionic trash in the second filtrate. These improvements are naturally of significant interest to the paper manufacturing process.

Dewatering

Part 3—Application in Paper Stock (Woodfree, Fine Paper)

In the second series, the Britt-jar was equipped with a larger-diameter drainage spout allowing the drainage speed of the stock to be measured directly as a function of the stock, the aids added and the sieve used. During this modified Britt-jar procedure, the filtrate was collected in a vessel placed on an electronic balance. The balance was programmed to send a signal of the registered weight at set time intervals to a computer, so that dewatering curves of filtrate weight against time could be recorded.

The results of these tests are shown in Table 10. The retention/dewatering system percent refers to dry weight of retention aid on dry weight of paper stock.

TABLE 10

Dewatering of woodfree, carbonate filled, neutral condition paper stock

| retention/dewatering system | measured time in sec until definite volumes are reached | | | |
|---|---|---|---|---|
| | 50 ml | 100 ml | 150 ml | 200 ml |
| | Dewatering time (seconds) | | | |
| no retention system | 47 | 125 | 235 | 312 |
| 0.06% cat. poly-acrylamide (PAA) | 13 | 38 | 87 | 141 |
| 0.03% cat cellulose + 0.03% cat. PAA | 9 | 22 | 52 | 117 |

The replacement of some of the water-soluble cationic polymer normally used (in this case polyacrylamide) by water-insoluble, cationized, beaten cellulose particles yields a surprising and significant increase in the dewatering speed for this paper stock. This means that when applied to a paper machine, the speed and thus the paper production can be increased.

EXAMPLE 37

Cationized cellulose from Examples 6, 7, 8, 9, 10, 11, 12, 13, 14, 15, 16, 17, 18, 19, 25 and 31 was used as a partial replacement of a water-soluble polymer retention system in papermaking and the results compared with each other. As a control, the polymer alone and a blank were used, and a cellulose was also included which was prepared using the procedure of Example 7 but without adding any cationizing agent.

Each product was beaten for 10 minutes by the beating procedure in Example 20 and used as a 3% slurry.

The test procedure used was the method of Example 36, Part 1. Each product was added in a standard concentration of 0.4% cationized cellulose with 0.2% water-soluble polyacrylamide as a retention aid system. The paper stock was also the same as in Example 36, Part 1.

The results are shown in Table 11.

TABLE 11

Britt-jar - comparison of various cationized cellulose products.
Retention expressed as solids in Britt-jar filtrate

| cationized cellulose product used - example no. | total solids in Britt-jar filtrate g/l |
|---|---|
| none used (blank) | 4.42 |
| non-cationized cellulose | 4.35 |
| 100% polymer - no cat. cellulose | 3.01 |
| 6 | 2.42 |
| 7 | 2.72 |
| 8 | 2.66 |
| 9 | 3.00 |
| 10 | 3.21 |
| 11 | 2.56 |
| 12 | 2.90 |

TABLE 11-continued

Britt-jar - comparison of various cationized cellulose products.
Retention expressed as solids in Britt-jar filtrate

| cationized cellulose product used - example no. | total solids in Britt-jar filtrate g/l |
|---|---|
| 13 | 2.87 |
| 14 | 2.58 |
| 15 | 2.77 |
| 16 | 2.94 |
| 17 | 2.80 |
| 19 | 2.91 |
| 25 | 2.70 |
| 31 | 2.87 |

In this Britt-jar test the retention was always higher with the use of cationized cellulose than with the polymer alone. This effect could not be detected with the use of non-cationized cellulose

EXAMPLE 38

Paper Properties

This example demonstrates that by replacing part of conventional retention systems by cationized cellulose one can maintain or improve the strength of the paper sheet with an increased filler content. This is of interest because increased filler content normally reduces paper strength.

Paper sheets were made using a laboratory sheet former. The stock used was basically similar to that used in Example 36, Part 1, that is a mixture of woodfree short and long fibers with calcium carbonate filler.

The cationized cellulose used was that from Example 7, with poly-DADMAC as the cationizing agent and 10 minutes of beating as described in Example 20.

A range of paper sheets were made using various retention systems and part of these retention aids being replaced by cationized cellulose as explained above.

TABLE 12

Properties of paper made on a laboratory sheet former
Woodfree, carbonate filled stock. Neutral conditions

| Retention system | Paper grammage g/m² | Filler content % | Porosity to air ml/min | Breaking length km |
|---|---|---|---|---|
| None | 65.1 | 2.2 | 2880 | 5.9 |
| 0.2% cat. PAA + 1.5% bentonite | 66.5 | 13.1 | 2710 | 4.4 |
| 0.6% cat. PAA | 67.4 | 13.9 | 2850 | 4.3 |
| 0.4% cat. cellulose (Ex. 7) + 0.2% cat. PAA | 67.0 | 15.4 | 2980 | 4.4 |

EXAMPLE 39

Fixing Agent for Anionic Trash in Papermaking

The product from Example 14, beaten for 10 minutes as described in Example 20, was used to treat a sample of groundwood papermaking fiber stock to fix anionic trash.

This stock, taken as an approximately 4% stock directly from the incoming fiber stream for a paper machine, contained relatively high levels of anionic trash, such as lignin-based, soluble and colloidally soluble substances that interfere with the papermaking process, especially the retention system.

The efficiency of cationized cellulose as a trash catcher was compared with inorganic, cationic fixing agents (polyaluminum chloride from Ekokemi) and organic, water-soluble cationic polymers (BASF CATIOFAST SL).

It could also be shown that an overdosing of conventional fixing agents can lead to overcationization of the paper machine water circuit, and thus also to adverse effects on retention.

Cationized cellulose was added to 500 ml of the groundwood stock and mixed for 5 minutes. The thus treated groundwood stock was subsequently filtered through a Schleicher & Schüll 589 black ribbon filter in a vacuum, and the filtrate was tested for turbidity, chemical oxygen demand and cationic demand.

This anionic charge is measured as cationic demand and results from titrating an aliquot of the filtrate against standardized cationic polymer (0.001 N polyethylene imine) in a particle charge detector or using suitable dyes such as ortho-toluidine blue as an end-point indicator. For overcationized filtrate, a standardized anionic polymer solution (0.001 N Na-PES) was used.

From these first tests, the cationic demand of the groundwood stock was calculated depending on the fixing agent used, and then twice the particular amount needed was added. The degree of overcationization of the filtrate was measured by titration and is expressed in the table as negative cationic demand.

TABLE 13

Anionic trash fixation in woody paper stock

| Fixing agent | Addition on solids % dry/dry | Turbidity in filtrate FNU | COD in filtrate mg $O_2$/l | Cationic demand in filtrate mg PSK/l |
|---|---|---|---|---|
| Blank-none | 0 | 268 | 328 | 57.5 |
| Polyaluminum chloride (PAC) | 0.3% | 220 | 312 | 49.7 |
| PAC - overdosed (2x neutrality) | 3.5% | 262 | 326 | -18.8 |
| CATIOFAST SL (organic polymer) | 0.05% | 165 | 302 | 40.2 |
| C. SL - overdosed (2x neutrality) | 0.33% | 191 | 366 | -27.5 |
| Cationized cellulose | 0.1% | 171 | 305 | 47.9 |
| Cat. cell. - overdosed (2x neutrality) | 1.2% | 167 | 278 | 1.3 |

The cationized cellulose from Example 14 exhibits a significant ability to fix anionic trash compared with conventional fixing agents but has the advantage that, due to its water-insoluble nature, it does not lead to overcationizing of the filtrate as occurs with the addition of water-soluble products.

EXAMPLE 40

Dyeing Behavior of Cationic Cellulose Threads

In a dye bath with a concentration of 5 g/l orange II the inventive cationized cellulose of Example 6 or alternatively non-cationized cellulose from the xanthogenate process is dyed. Spun threads with 3 dtex were used. The bath ratio is 1:6. The dyeing took place at room temperature for 30 min. After removal of the spent bath, rewashing with desalinated water and drying are performed.

Measuring Results:

| | Extinction of spent bath 1:100 dil. | Whiteness ISO | | |
|---|---|---|---|---|
| | | L | A | B |
| Blank value | 0.3 | | | |
| Non-cat. cellulose | 1.732 | 15.40 | 71.96 +38.97 | +42.73 |
| Cat. cellulose | 0.461 | 1.38 | 37.74 +51.23 | +44.58 |

Elrepho 2000 for whiteness/color location measurement
Sample Preparation:

The dried thread is wound as uniformly as possible onto a cardboard strip 30 mm wide. The winding thickness must be so high that no change of measured value takes place through the surface of the cardboard.

It turns out during the washes of the samples that the fibrous material consisting of cationized cellulose has much higher color fastness than the non-cationized quality.

EXAMPLE 41

The total measurable cationicity of the invented cationized cellulose particles (produced as in Example 7 but with a lower level of polydadmac cationizing agent) was measured by treating the product with an excess of a standardized anionic polymer solution (0.001 N polyethylene suphonic acid) for one hour followed by a back-titration using a particle charge detector for the end-point.

A surface-cationized cellulose fibre stock was similarly analyzed for cationicity. This surface-cationized cellulose fibre product was made using glycidyl-ammonium chloride as cationizing agent. Both the invented product and the surface-cationized cellulose fibres were shown to have similar total cationicity (1 hour test) endowed by quaternary ammonium cationic groups.

Both products were made up as a 5% slurry and beaten in a Jokromill for various times. The total measurable cationicity was analyzed after each beating stage. Where the invented cationized cellulose particles showed a progressive increase in measurable charge the surface cationized cellulose fibres did not show a significant charge increase on beating thus demonstrating the respective charge distribution in the two products. See Table 14.

TABLE 14

| Beating Duration in Jokro Mill. (Min) | Invented Cationized Cellulose Particles. (Cationicity µeq/g on Dry Substance) | Surface-cationized Cellulose Fibres. (Cationicity µeq/g on Dry Substance) |
|---|---|---|
| 0 | 174 | 460 |
| 5 | 248 | 465 |
| 10 | 344 | 467 |
| 15 | 391 | 470 |
| 30 | 446 | 472 |
| 45 | 470 | 478 |

EXAMPLE 42

A 5% slurry of ground wood (mechanical pulp) was measured for cationic demand in filtrate (the anionic charge is nitrated against 0.001 N standardized polydadmac solution using a particle charge detector to detect the end-point). The slurry was beaten for ten minutes in a Jokro mill and the cationic demand remeasured. In a second experiment, a 5% slurry of coated broke was dispersed for ten minutes in a laboratory pulper, analyzed for cationic demand, beaten for ten minutes in a Jokro mill and reanalyzed for cationic demand. In both cases the level of anionic charge, namely the level of anionic trash was seen to increase on beating. See Table 15.

TABLE 15

| Beating time - Jokro Mill | Cationic Demand ($\mu$eq/l) | |
|---|---|---|
| Mins | 5% Ground Wood | 5% Coated Broke |
| 0 | 305 | 215 |
| 10 | 393 | 327 |

EXAMPLE 43

A sample of ground wood was divided in four parts. One part was considered a blank. The other three were treated individually with the following cationic fixing agents at the same level of added total measured cationic charge (1 hour test) in a slowly stirred beaker:

A polydadmac fixing agent (commercially supplied to paper industry as a 20% solution in water).

A surface cationized, bleached long-fibre cellulose pulp (cationized with a reactive monomer) as used in Example 41.

The invented product as used in Example 41.

All four test systems were subsequently treated in a high shear mixer for various times to simulate refining and pumping shear forces that would be experienced in a paper machine. After each stage, a sample of the stock was filtered through a black-band filter paper and the filtrate tested for residual anionic or cationic charge by titration against 0.001 N polydadmac (to measure anionic charge) or polyethylene sulphonic acid (for cationic charge). The COD (chemical oxygen demand) in the filtrate at each stage was analyzed as a measure of the dissolved or colloidal organic substances present.

Although all three fixing agents reduce the cationic demand in the system similarly, the invented cationic cellulose product gives a better fixation of dissolved or colloidal organic substances as shown by COD than either the surface-cationized cellulose fibres or in fact the soluble cationic polymer under the simulated shear conditions. See Table 16.

A surface cationized, bleached long-fibre cellulose pulp (cationized with a reactive monomer) as used in Example 41.

The invented product as used in example 41.

After ten minutes, an optical brightener was added to the test stocks. A paper sheet was made from the test samples and tested for whiteness (UV) and base whiteness. The COD was also measured on filtrate from the test stocks to compare fixing efficiency.

The polyamine fixing agent has a quenching effect on the optical brightening agent. The surface cationized cellulose has a lower but still significantly negative effect but surprisingly, the invented cationic cellulose particles have almost no effect on the efficiency of the OBA. See Table 17.

TABLE 17

| Test Stock | Base Whiteness | UV Whiteness | COD Filtrate mg $O_2$/g |
|---|---|---|---|
| Blank - no fixer, no OBA | 86.7 | 95.3 | 1320 |
| Only OBA | 87.2 | 104.9 | 1370 |
| Polyamine treated + OBA | 86.9 | 99.7 | 1030 |
| Surface cationized cellulose + OBA | 87.0 | 101.4 | 1050 |
| Invented cationized cellulose + OBA | 87.2 | 104.2 | 1040 |

The foregoing description is, at present, considered to be the preferred embodiments of the present invention. However, it is contemplated that various changes and modifications apparent to those skilled in the art, may be made without departing from the present invention. Therefore, the foregoing description is intended to cover all such changes and modifications encompassed within the spirit and scope of the present invention, including all equivalent aspects.

We claim:

1. A cellulose particle comprising cationic groups, wherein at least 10% of said cationic groups are present in the interior of said particle.

2. The cellulose particle of claim 1, wherein at least 50% of said cationic groups are present in the interior of said particle.

3. The cellulose particle of claim 1, wherein said cationic groups in the interior of the particle are immobilized.

TABLE 16

Ground Wood Treated With Various Fixing Agents

Residual Anionic (−) Charge and COD in Filtrate From Treated Group Wood Pulp

| | Polydadmac Solution | | Surface-cationized Cellulose Fibres | | Invented Cationized Particles | |
|---|---|---|---|---|---|---|
| Shearing Time Mins | Charge $\mu$eq/l | COD mg $O_2$/l | Charge $\mu$eq/l | COD mg $O_2$/l | Charge $\mu$eq/l | COD mg $O_2$/l |
| blank - no fixing | −355 | 2430 | −355 | 2430 | −355 | 2430 |
| 0 | −170 | 1890 | −183 | 1900 | −299 | 2280 |
| 1 | −197 | 2010 | −202 | 2090 | −252 | 1950 |
| 5 | −210 | 2320 | −213 | 2210 | −207 | 1890 |

EXAMPLE 44

A paper stock from the mixing chest of a fine paper machine was treated with the following fixing additives with 10 minutes mixing. All three additives had the same cationicity measured by a 1 hour back-titration test.

A polyamine fixing agent (commercially supplied to paper industry as a 50% solution in water).

4. The cellulose particle of claim 1, wherein said cationic groups are bound covalently to the cellulose.

5. The cellulose particle of claim 1, wherein the concentration of cationic groups in said particle is constant or increases from the exterior of said particle to the interior of said particle.

6. The cellulose particle of claim 1, wherein at least one cationic group is present per 100 anhydroglucose units of the cellulose.

7. The cellulose particle of claim 1, wherein said particle has a mean particle size of from about 0.001 to about 10 mm.

8. The cellulose particle of claim 1, wherein said particle has a mean particle size of from about 0.1 to about 1 mm.

9. Cellulose particles having cationic groups, distributed across the entire cross-section of said particles, the concentration of said cationic groups being constant or increasing from the exterior to the interior of the particles, and wherein at least one cationic group is present per 100 anhydroglucose units of the cellulose.

10. The cellulose particles of claim 9, wherein the cationic groups are formed by cationic polyelectrolytes.

11. A cellulose particle comprising cationic groups, wherein said particle is in the shape of a fiber, at least 10% of said cationic groups are present in the interior of said particle, the concentration of said cationic groups in said particle is constant or increases from the exterior of said particle to the interior of said particle, and said particle has a length of from about 0.15 mm to about 1 mm.

12. The cellulose particle of claim 11 wherein at least 50% of said cationic groups are present in the interior of said particle.

13. The cellulose particle of claim 11 wherein at least 90% of said cationic groups are present in the interior of said particle.

14. The cellulose particle of claim 11 wherein said particle has a nitrogen content of up to 9.6%.

* * * * *